(12) United States Patent
Yamashita et al.

(10) Patent No.: US 12,334,749 B2
(45) Date of Patent: Jun. 17, 2025

(54) POWER TRANSMITTING COIL UNIT

(71) Applicant: TOYOTA JIDOSHA KABUSHIKI KAISHA, Aichi-ken (JP)

(72) Inventors: Osamu Yamashita, Toyota (JP); Naoki Iwata, Kasugai (JP); Shinjiro Saigusa, Toyota (JP); Sungmin Cho, Susono (JP); Katsuya Kobayashi, Okazaki (JP); Toshiya Hashimoto, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 1 day.

(21) Appl. No.: 18/454,065

(22) Filed: Aug. 23, 2023

(65) Prior Publication Data
US 2024/0088718 A1  Mar. 14, 2024

(30) Foreign Application Priority Data

Sep. 12, 2022  (JP) .................................. 2022-144554

(51) Int. Cl.
*H02J 50/00* (2016.01)
*H02J 50/12* (2016.01)

(52) U.S. Cl.
CPC ............ *H02J 50/12* (2016.02); *H02J 50/005* (2020.01)

(58) Field of Classification Search
CPC .......... H02J 50/12; H02J 50/005; H02J 50/10; H02J 50/00; Y02T 10/70; Y02T 10/7072; Y02T 90/14; H01F 27/022; H01F 27/06; H01F 27/2804; H01F 27/40; H01F 38/14
USPC ......................................................... 307/104
See application file for complete search history.

(56) References Cited

U.S. PATENT DOCUMENTS

| 10,177,603 B2* | 1/2019 | Nakahara ................ H02J 50/12 |
| 2009/0195963 A1* | 8/2009 | Masuda ................... H01G 9/07 361/312 |
| 2013/0181667 A1* | 7/2013 | Takeshita ................ B60L 53/12 320/108 |

FOREIGN PATENT DOCUMENTS

| JP | 2021-022624 A | 2/2021 |
| WO | 2012/039077 A1 | 3/2012 |

* cited by examiner

*Primary Examiner* — Rexford N Barnie
*Assistant Examiner* — Xuan Ly
(74) *Attorney, Agent, or Firm* — HAUPTMAN HAM, LLP

(57) ABSTRACT

A power transmitting coil unit includes a board on which a coil comprised of a conductor pattern is formed and to a back surface side of which capacitors are mounted, a core arranged at a back surface side of the board and formed with a hole at a position facing the capacitors, a bottom plate arranged at a back surface side of the core, a space formed defined by a back surface of the board, a front surface of the bottom plate, and an inner circumferential surface of the hole and in which the capacitors are housed, and support member arranged in the space and supporting the board.

9 Claims, 2 Drawing Sheets

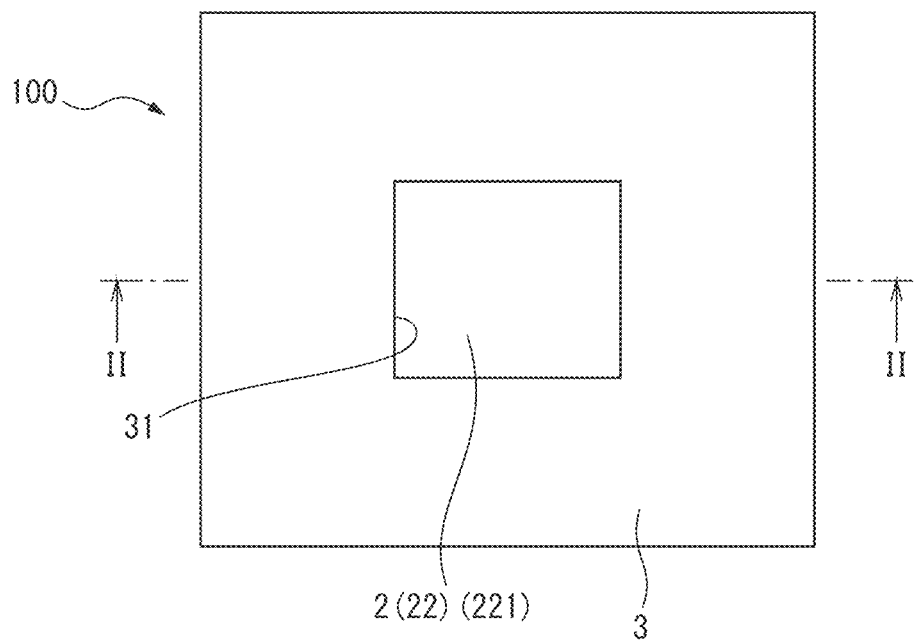
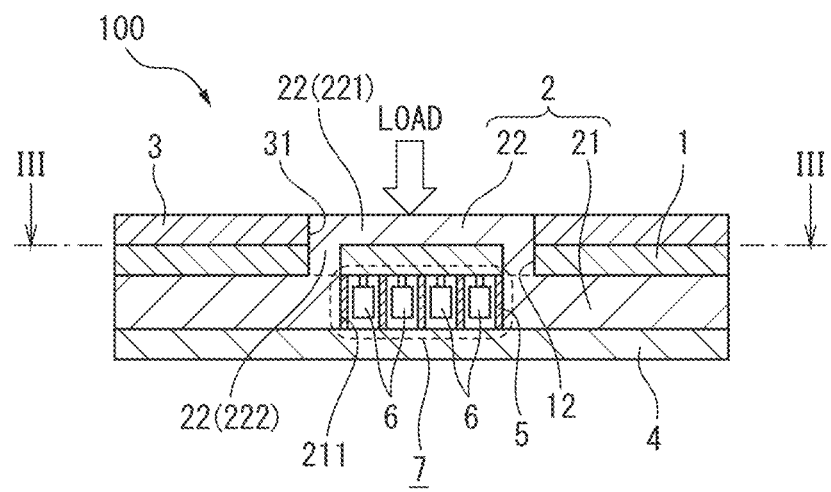

POWER TRANSMITTING COIL UNIT

RELATED APPLICATIONS

The present application claims priority of Japanese Patent Application No. 2022-144554 filed Sep. 12, 2022, the disclosure of which is hereby incorporated by reference herein in its entirety.

FIELD

The present disclosure relates to a power transmitting coil unit.

BACKGROUND

WO2012/039077 discloses a conventional power transmitting coil unit (power transmitting device) for non-contact power supply in which a group of capacitors and other electronic components are covered by a housing and that housing is used to protect the group of electronic components from a load applied from above.

SUMMARY

It may be considered to configure a power transmitting coil unit as a thin, portable flat shaped power supply mat and to for example set it at an event site or evacuation site or other place where usually non-contact power supply is not available so as to enable non-contact power supply at those locations. However, in the above-mentioned conventional power transmitting coil unit, a housing was necessary for protecting the group of capacitors and other electronic components, so it was difficult to realize smaller size or reduced weight of the power transmitting coil unit and, consequently, there was the problem that transport and placement of the power transmitting coil unit were difficult.

The present disclosure was made focusing on such a problem and has as its object to realize smaller size or reduced weight of a power transmitting coil unit.

To solve the above problem, according to one aspect of the present disclosure, a power transmitting coil unit for transmitting electric power to a receiving object by non-contact comprises a board on which a coil comprised of a conductor pattern is formed and to a back surface side of which capacitors are mounted, a core arranged at a back surface side of the board and formed with a hole at a position facing the capacitors, a bottom plate arranged at a back surface side of the core, a space formed defined by a back surface of the board, a front surface of the bottom plate, and an inner circumferential surface of the hole and in which the capacitors are housed, and a support member arranged in the space and supporting the board.

According to this aspect of the present disclosure, the space formed defined by the back surface of the board, the front surface of the bottom plate, and the inner circumferential surface of the hole holds the capacitors, so even without a housing, the load support member arranged in that space can be used to protect the capacitors. For this reason, there is no need to cover the power transmitting coil unit by a housing and smaller size or reduced weight of the power transmitting coil unit can be realized.

BRIEF DESCRIPTION OF DRAWINGS

FIG. 1 is a schematic plan view of a power transmitting coil unit according to one embodiment of the present disclosure.

FIG. 2 is a schematic cross-sectional view of a power transmitting coil unit along a line II-II of FIG. 1.

DESCRIPTION OF EMBODIMENTS

Figure 3:
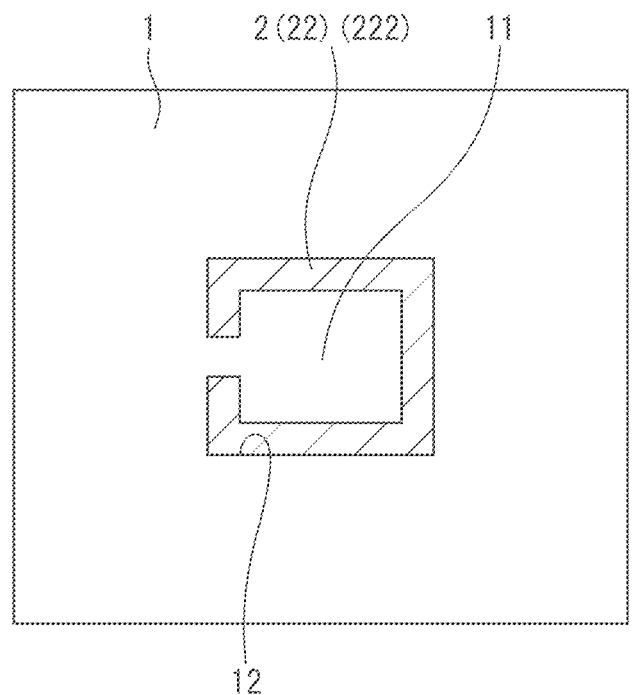
FIG. 3 is a schematic cross-sectional view of a power transmitting coil unit along a line III-III of FIG. 2.

Below, referring to the drawings, an embodiment will be explained in detail. Note that, in the following explanation, similar component elements will be assigned the same reference notations.

FIG. 1 is a schematic plan view of a power transmitting coil unit 100 according to one embodiment of the present disclosure. FIG. 2 is a schematic cross-sectional view of the power transmitting coil unit 100 along a line II-II of FIG. 1. FIG. 3 is a schematic cross-sectional view of the power transmitting coil unit 100 along a line III-III of FIG. 2.

The power transmitting coil unit 100 is configured to be able to transmit electric power supplied from an external AC power supply or other power supply to a receiving object by non-contact. The receiving object is not particularly limited in type and may be a vehicle, drone, or other moving object and may also be a communication device, household electric appliance, etc. Further, the power transmitting coil unit 100 is transportable and is configured to be able to be set at an event site or evacuation site or other place where usually non-contact power supply is unavailable so as to enable non-contact power supply to receiving objects used at those locations.

The power transmitting coil unit 100 according to the present embodiment is provided with a printed coil board 1, core 2, spacer 3, bottom plate 4, and load support member 5. It is made a thin flat shape so as to enable a vehicle to easily ride up onto it. Below, details of the component parts of the power transmitting coil unit 100 will be explained.

The printed coil board 1 is a hard printed circuit board on the front surface of which a transmitting coil (not shown) comprised of a conductor pattern is formed. At the back surface side of the center part of the printed coil board 1, for example, capacitors 6 and other electronic components are mounted by soldering etc. In the printed coil board 1, if the region at the center part where the capacitors 6 are attached is referred to as the "capacitor mounting region 11", the printed coil board 1 is formed with a C-shaped core fitting hole 12 for fitting a projecting part 222 of an upper core 22 of the core 2 so as to surround the circumference of the capacitor mounting region 11. Further, at the region at the outside from this core fitting hole 12, the power transmitting coil comprised of the conductor pattern is formed.

The power transmitting coil formed on the printed coil board 1 forms a resonance circuit together with the capacitors 6 mounted on the printed coil board 1 and transmits power by non-contact by magnetic resonant coupling (magnetic field resonance) to a receiving object placed on the power transmitting coil unit 100.

The core 2 is provided with a lower core 21 and an upper core 22 respectively formed by ferrite or other magnetic materials.

The lower core 21 is a flat plate shaped member with a hole 211 formed at its center part and is arranged at a back surface side of the printed coil board 1. The hole 211 of the lower core 21 functions as a capacitor holding space 7 in which capacitors 6 mounted on the printed coil board 1 are held when placing the printed coil board 1 on the front surface of the lower core 21 and placing the bottom plate 4 on the back surface of the lower core 21. That is, the capacitor holding space 7 is a space formed defined by a back surface of the printed coil board 1, an inner circumferential surface of the hole 211 of the lower core 21, and a front surface of the bottom plate 4 when placing the printed coil board 1 on the front surface of the lower core 21 and placing the bottom plate 4 on the back surface of the lower core 21.

The upper core 22 is provided with a flat plate shaped top part 221 covering the front surface of the capacitor holding region 11 of the printed coil board 1 and a projecting part 222 projecting downward from the top part 221 and fitting with the core fitting hole 12 of the printed coil board 1.

The spacer 3 is a plastic member placed on the front surface of the printed circuit board 1 for making the front surface of the power transmitting coil unit 100 flat, that is, for eliminating the step difference formed between the printed coil board 1 and the upper core 22. The spacer 3 is formed at its center part with a core fitting hole 31 for fitting the top part 221 of the upper core 22. The projecting part 222 of the upper core 22 is fit with the core fitting hole 12 of the printed coil board 1 while the top part 221 of the upper core 22 is fit with the core fitting hole 31 of the spacer 3.

The bottom plate 4 is a flat plate shaped member comprised of a metal material (for example, aluminum or copper) functioning as an electromagnetic shield and is placed over the entire back surface side of the lower core 21. The bottom plate 4 keeps magnetic flux from leaking to the outside from the back surface side of the power transmitting coil unit 100.

The power transmitting coil unit 100 according to the present embodiment is a multilayer member comprised of the bottom plate 4, core 2, printed coil board 1, and spacer 3 stacked together and is not provided with a housing for holding the stack inside it for protection. For this reason, reduced weight and smaller size of the power transmitting coil unit 100 can be realized and transport can be facilitated. On the other hand, at the time of supplying power, the load of a vehicle etc. riding up over the power transmitting coil unit 100 or other such receiving object is directly applied to the power transmitting coil unit 100. As a result, the load of the receiving object causes the printed coil board 1 to bend resulting in the capacitor holding space 7 being compressed and the capacitors 6 inside it being liable to be crushed or otherwise damaged. Therefore, in the present embodiment, the capacitor holding space 7 is provided with a load support member 5.

The load support member 5 is provided with supports extending in a thickness direction (stacking direction) of the power transmitting coil unit 100 so as to enable the printed coil board 1 to be supported. It is arranged in the capacitor holding space 7 so that the top ends of the supports abut against the back surface of the printed coil board 1 and the bottom ends of the supports abut against the front surface of the bottom plate 4.

Figure 4:
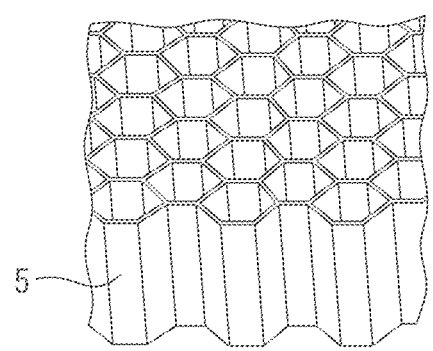
FIG. 4 is a schematic perspective view of a load support member according to one embodiment of the present disclosure.

FIG. 4 is a schematic perspective view of the load support member 5 according to the present embodiment. As shown in FIG. 4, in the present embodiment, the load support member 5 is a honeycomb structure comprised of hollow supports with hexagonal cross-sections and is designed to hold capacitors 6 inside the supports.

Of course, the configuration of the load support member 5 is not limited to this such configuration. For example, if making the load support member 5 a structure comprised of a group of hollow columnar supports similar to FIG. 4, the cross-sections of the individual supports may be made circular or triangular or other ones besides hexagonal ones. Further, for example, the load support member 5 need not be made a structure comprised of a group of hollow supports and may be made a structure where plate-shaped supports are arranged between the capacitors 6, that is, a structure where the capacitor holding space 7 is partitioned by a plurality of plate shaped supports and the spaces partitioned by the supports hold the individual capacitors 6.

By placing the load support member 5 in the capacitor holding space 7 formed at the back surface side of the printed coil board 1, it is possible to support the printed coil board 1 from the back surface side and keep the printed coil board 1 from bending when a load is applied to the power transmitting coil unit 100. For this reason, it is possible to keep the capacitor holding space 7 from being compressed and the capacitors 6 at the inside from being crushed and otherwise ending up being damaged. In this way, according to the present embodiment, the capacitor holding space 7 holds the capacitors 6 so it is possible to protect the capacitors 6 even without a housing. For this reason, it is possible to realize both smaller size and reduced weight of the power transmitting coil unit 100.

Note that, when placing the load support member 5 in the capacitor holding space 7, if bonding the top ends of the supports to the back surface of the printed coil board 1 and bonding the bottom ends of the supports to the front surface of the bottom plate 4, it is possible to enhance the rigidity of the printed coil board 1 compared to if not bonding the supports. Therefore, by bonding the top ends of the supports of the load support member 5 to the back surface of the printed coil board 1 and bonding the bottom ends of the supports to the back surface of the bottom plate 4, it is possible to better keep the printed coil board 1 from bending, so it is possible to raise the load resistance of the power transmitting coil unit 100.

Further, the load support member 5 may be any of one made of plastic, paper, or metal. Here, if making the load support member 5 metal, compared with if making the load support member 5 plastic or paper, the strength of the load support member itself can be raised, so the load resistance of the power transmitting coil unit 100 can be raised. However, if making the load support member 5 metal, there would be a concern over generation of heat at the load support member 5 due to induction heating, but in the present embodiment, the core 2 is interposed as a path for passage of magnetic flux between the power transmitting coil formed at a region at the outside from the core fitting hole 12 of the printed coil board 1 and the capacitor holding space 7, so there is little magnetic flux leaking out from the capacitor holding space 7 and therefore generation of heat at the load support member 5 can be suppressed.

The power transmitting coil unit 100 according to the present embodiment explained above is provided with a printed coil board 1 (board) on which a power transmitting coil comprised of a conductor pattern is formed and to a back surface side of which capacitors 6 are attached, a core 2 arranged at a back surface side of the printed coil board 1 and formed with a hole 211 at a position facing the capacitors 6, a bottom plate 4 arranged at a back surface side of the core 2, a capacitor holding space 7 (space) formed defined by a back surface of the printed coil board 1, a front surface of the bottom plate 4, and an inner circumferential surface of the hole 211 and in which the capacitors 6 are housed, and a load support member 5 (support member) arranged in the capacitor holding space 7 and supporting the printed coil board 1.

Due to this, by holding the capacitors 6 in the capacitor holding space 7, even without a housing, it is possible to protect the capacitors 6 by the load support member 5 placed in the capacitor holding space 7. For this reason, there is no need to cover the power transmitting coil unit 100 by a housing and smaller size and reduced weight of the power transmitting coil unit 100 can be realized.

The load support member 5 has supports abutting against the back surface of the printed coil board 1 at one end and abutting against the front surface of the printed coil board 1 at the other end to thereby support the printed coil board 1. Specifically, in the present embodiment, the load support member 5 is made a honeycomb structure comprised of a group of hollow supports with hexagonal cross-sections and is configured to be able to hold the capacitors 6 inside the supports. By making the load support member 5 a honeycomb structure in this way, it is possible to enhance the compressive strength of the load support member 5 while reducing the weight of the load support member 5.

Further, in the present embodiment, one end of each support was bonded to the back surface of a printed coil board 1 and the other end was bonded to the front surface of a bottom plate 4. Due to this, compared with the case of not bonding the supports, it is possible to raise the rigidity of the printed coil board 1. For this reason, it is possible to better keep the printed coil board 1 from bending, so it is possible to raise the load resistance of the power transmitting coil unit 100.

Above, an embodiment of the present disclosure was explained, but the above embodiment only showed one of the examples of application of the present disclosure and was not intended to limit the technical scope of the present disclosure to the specific configuration of the above embodiment.

For example, in the above embodiment, the capacitor holding space 7 held the capacitors 6, but the disclosure is not limited to capacitors 6 and may also hold various other electronic components.

The invention claimed is:

1. A power transmitting coil unit configured to transmit electric power to a receiving object by non-contact, the power transmitting coil unit comprising:
    a board on which a coil comprised of a conductor pattern is formed and to a back surface side of which capacitors are mounted;
    a core arranged at a back surface side of the board and formed with a hole at a position facing the capacitors;
    a bottom plate arranged at a back surface side of the core;
    a space formed defined by a back surface of the board, a front surface of the bottom plate, and an inner circumferential surface of the hole and in which the capacitors are housed; and
    a support member arranged in the space and supporting the board.

2. The power transmitting coil unit according to claim 1, wherein
    the support member has supports which abut against a back surface of the board at one end and abut against the front surface of the bottom plate at the other end to thereby support the board.

3. The power transmitting coil unit according to claim 2, wherein
    the support member is a honeycomb structure comprised of a group of hollow supports with hexagonal cross-sections, and
    the capacitors are housed inside of the supports.

4. The power transmitting coil unit according to claim 2, wherein
    one end of each support is bonded to the back surface of the board and the other end is bonded to the front surface of the bottom plate.

5. The power transmitting coil unit according to claim 1, wherein
    the coil comprised of the conductor pattern is formed on a front surface of the board, and
    the capacitors are directly mounted on the back surface of the board opposite to the front surface.

6. The power transmitting coil unit according to claim 5, wherein
    the board includes a C-shaped core fitting hole,
    the capacitors are mounted directly in a first region of the board surrounded by the C-shaped core fitting hole, and
    the coil comprised of the conductor pattern is formed in a second region of the board outside of the first region.

7. The power transmitting coil unit according to claim 6, wherein
    the core includes
        a lower core arranged at the back surface side of the board, and
        an upper core including
            a projecting part extending from the lower core and through the C-shaped core fitting hole, and
            a top part connected to the projecting part and covering the front surface of the board at the first region.

8. The power transmitting coil unit according to claim 7, wherein
    the space in which the capacitors are housed is defined by the back surface of the board, the front surface of the bottom plate, and the inner circumferential surface of the hole of the lower core.

9. The power transmitting coil unit according to claim 8, further comprising:
    a spacer, on the front surface of the board, including a core fitting hole fitting the top part of the upper core, wherein
    a surface of the spacer is aligned with that of the top part of the upper core.

* * * * *